(No Model.)
W. J. TAYLOR.
APPARATUS FOR THE MANUFACTURE OF GAS.
No. 431,535. Patented July 1, 1890.
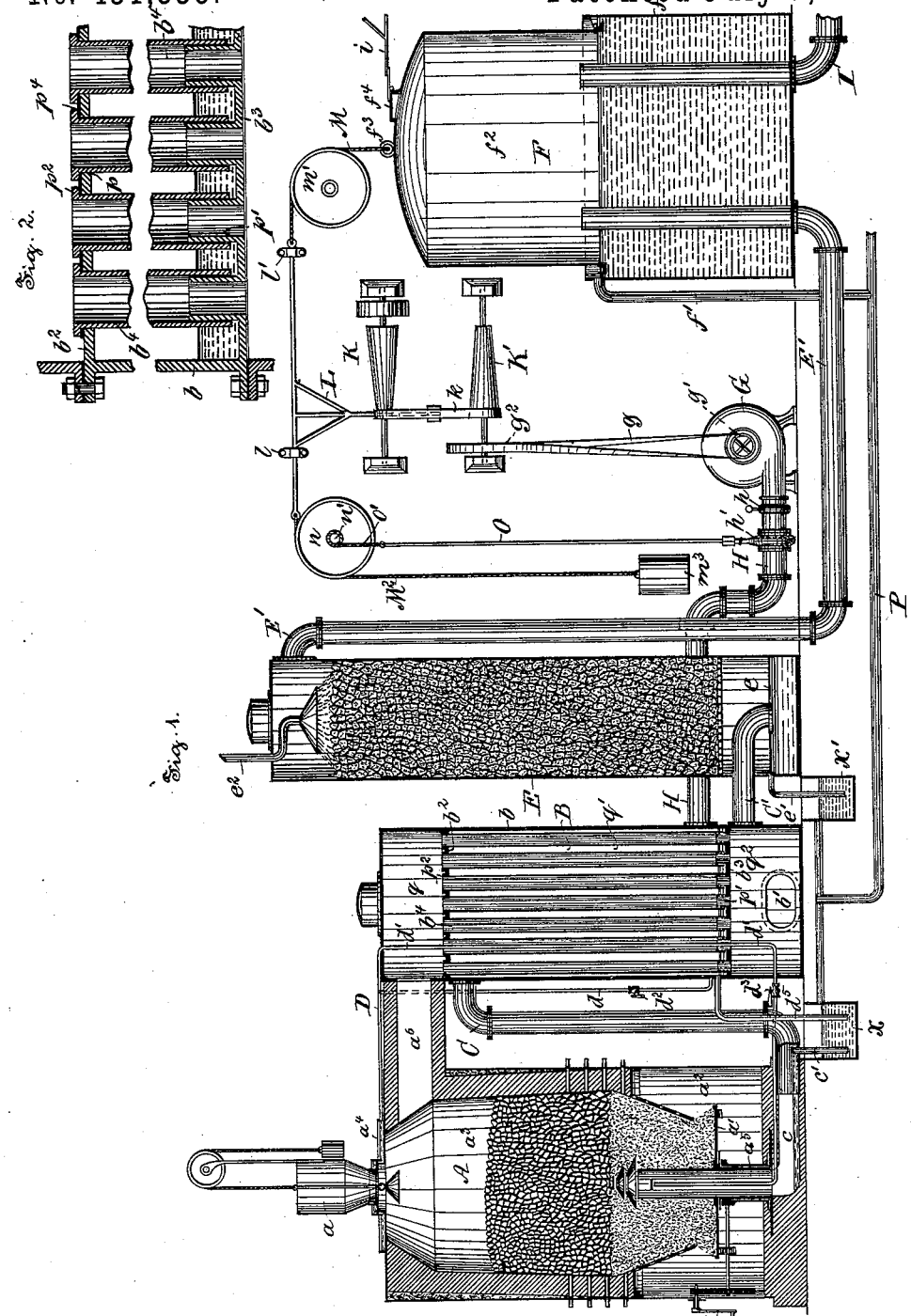

UNITED STATES PATENT OFFICE.

WILLIAM J. TAYLOR, OF CHESTER, ASSIGNOR TO THE TAYLOR GAS PRODUCER COMPANY, OF CAMDEN, NEW JERSEY.

APPARATUS FOR THE MANUFACTURE OF GAS.

SPECIFICATION forming part of Letters Patent No. 431,535, dated July 1, 1890.

Application filed December 26, 1889. Serial No. 334,963. (No model.)

*To all whom it may concern:*

Be it known that I, WILLIAM J. TAYLOR, a citizen of the United States, residing at Chester, in the county of Morris and State of New Jersey, have invented certain new and useful Improvements in Apparatus for the Manufacture of Gas, of which the following is a specification.

My invention relates to an apparatus or plant for converting solid fuel—such as anthracite or buckwheat coal, &c.—into what is known as "producer-gas" for use in gas-engines direct, and apparatus or a plant of such type as to permit of the return of the sensible heat of the generated gas to the producer for the dissociation of water-vapor, which increases the quantity of hydrogen, and consequently decreases the quantity of nitrogen, in the gas.

Heretofore producer-gas has been advantageously used in connection with metallurgical and other furnaces because the sensible heat of the gas would deliver a large proportion of the primary heat of combustion to the furnace; but such gas has not been availed of to any considerable extent for running gas-engines, first, because the gas was so deficient in combustible in proportion to its volume that it has not been practicable to provide a receiver of such capacity as to hold a sufficient supply of gas to permit of the driving of an engine for any length of time; second, because a cold and absolutely clean gas must be delivered to the engine—that is, a gas entirely free from solid matter—and, moreover, to render producer-gas available for such purposes it is essential that the major portion of the sensible heat of the generated gas be returned to the producer for causing an increased dissociation of the water-vapor, and thereby increasing the quantity of hydrogen and decreasing the quantity of nitrogen in the gas.

The principal objects of my invention are, first, to provide an efficient apparatus or plant for making from solid fuel a cold and absolutely clean producer-gas, rich in a high degree in combustible, and thereby especially adapting the same for gas-engine purposes; second, to provide an efficient apparatus capable of largely returning the sensible heat of the generated gas to the producer for permitting of an increased dissociation of water-vapor, which thereby increases the quantity of hydrogen, and consequently decreases the quantity of nitrogen, in the gas, and, third, to provide apparatus by which the production of the gas can be so increased and diminished as to render the supply at all times practically equal to requirements of the gas-engine.

My invention consists of the construction, arrangement, and combination of parts in an apparatus constituting an organized plant for generating producer-gas from solid fuel for use in gas-engines direct and of largely returning the sensible heat of the gas to the producer, as hereinafter described, and particularly pointed out in the claims.

The nature and characteristic features of my present invention will be more fully understood from the accompanying drawings, forming part hereof, and in which—

Figure 1 is a view, partly in elevation and partly in section, of an apparatus constituting a plant especially adapted for gasifying solid fuel and cooling and permitting of the delivery of the gas to the gas-engine direct, and also for largely returning the sensible heat of the generated gas to the producer; and Fig. 2 is a vertical sectional view, on an enlarged scale, of portions of the combined gas-cooler and air-heater with the tubes thereof broken away, and showing in detail the preferred arrangement and manner of supporting the tubes in the cooler and heater.

Referring to the drawings, A is a so-called "Taylor" gas-producer, provided with a hopper $a$ for the introduction of fuel into the combustion-chamber $a^3$.

$a'$ is a bottom capable of being revolved by means of a crank $a^7$.

$a^2$ is a sealed ash-chamber located in the lower part of the producer.

$a^5$ is a vertical inlet-pipe extending through the bottom $a'$ into the combustion-chamber $a^3$.

$a^6$ is a gas-offtake leading from the upper part of the producer to a combined gas-cooler and air-heater B. This gas-cooler and air-heater B consists of a cylindrical or rectangular shell or casing $b$, divided into an upper chamber $q$, a central chamber $q'$, and a lower chamber $q^2$. The casing or shell $b$, surrounding the chamber $q^2$, is provided with a door $b'$ for removing extraneous matter deposited in the bottom of this chamber by the gas. The horizontal plate or head $b^2$, Fig. 2, provided with apertures $p$, is bolted or otherwise secured to the interior of the shell or casing $b$, near the top thereof, and the horizontal perforated plate or head $b^3$, provided with vertical annular flanges $p'$, is bolted or otherwise secured to the interior of the shell or casing $b$, near the lower portion thereof.

$b^4$ is a series of tubes having flanged upper extremities $p^2$. The series of vertical tubes $b^4$ are inserted through the apertures $p$ of the plate $b^2$, and, surrounding the flanges $p'$ of the plate $b^3$, are held to place by the flanges $p^2$ contacting with the plate or head $b^2$. Gaskets $p^4$ are interposed between the flanges $p^2$ and the plate $b^2$ for insuring air-tight joints thereat. Sufficient clearance is provided between the lower extremities of the series of tubes $b^4$ and the plate or head $b^3$ for permitting of expansion and contraction.

C is a pipe communicating with the upper portion of the chamber $q'$, surrounding the tubes $b^4$, and the lower horizontal extension $c$ thereof is in communication with the vertical inlet-pipe $a^5$. The lower extension $c$ of the pipe or conduit C is provided with a branch drain-pipe $c'$, leading to a trap $x$.

C' is a pipe leading from the lower chamber $q^2$ into the bottom or water-sealed chamber $e$ of the scrubber E.

D is a small pipe in connection with the water-cooled top $a^4$ of the producer A. This pipe D is provided with two branch pipes $d$ and $d'$. The branch pipe $d$, with a stop-cock $d^2$, leads to the bottom of the central chamber $q'$. The branch pipe $d'$, with a stop-cock $d^3$, is preferably led downward through the chamber $q$ and one of the tubes $b^4$ to and across the chamber $q^2$ into the lower horizontal extension $c$ of the vertical inlet-pipe $a^5$.

$d^5$ is an overflow-pipe in communication with the central chamber $q'$ above the plate or head $b^3$, and also with the trap $x$.

E is a scrubber containing coke or other preferred porous material, which is suitably supported therein. The bottom of the scrubber E is provided with a water-sealed chamber $e$ and an overflow-pipe $e'$, which leads into a trap $x'$. At the top of the scrubber E is provided a water-supply pipe $e^2$, preferably arranged so that the water may be discharged in the form of a spray or shower onto the porous material supported therein.

E' is a gas-offtake pipe or conduit extending from the top of the scrubber E into the interior of the gas receiver or regulator F. This gas receiver or regulator consists of a tank $f$, adapted to receive and contain a suitable quantity of water, and provided with a waste-pipe $f'$, and a dome or cover $f^2$, provided with a lug having an eye $f^3$, cast or secured to the top thereof. The dome or cover $f^2$ of the receiver or regulator F is provided with a blow-off valve $f^4$, actuated in any preferred manner.

G is a rotary fan or blower driven by the belt $g$, passing over pulleys $g'$ and $g^2$.

H is a conduit or pipe provided with a hand-valve $h$ and an automatic valve $h'$. This pipe or conduit H communicates with the fan or blower G and the chamber $q'$, surrounding the vertical tubes $b^4$.

I is a conduit or pipe extending upward through the gas receiver or regulator F and leading therefrom to a gas engine.

$i$ is a projecting lug or arm for actuating the blow-off valve $f^4$ when the receiver rises above the required limit.

K and K' are differential cones. Motion is imparted to the upper cone K from a power-shaft or in any other preferred manner. The rotation of the cone K is communicated by means of the belt $k$ to the lower cone K', and by means of the belt $g$, passing over the pulleys $g'$ and $g^2$, is the blower G actuated.

L is a belt-shifter capable of sliding in the stationary bearings $l$ and $l'$ and engaging with the belt $k$.

M is a cord or chain passing over a pulley $m'$ and secured at its respective extremities to the eye $f^3$ of the dome $f^2$ of the receiver or regulator F and to the belt-shifter L.

$n$ is a pulley mounted on a shaft $n'$.

$M^2$ is a cord or chain passing over the pulley $n$, and secured at one extremity to the belt-shifter L and at the opposite extremity to the counter-weight $m^3$.

$o$ is a rod connected at one extremity with the gate of the valve $h'$ and at the opposite extremity to a cord $o'$, secured to and adapted to be wound on or off the shaft $n'$ when the pulley $n$ is rotated.

P is a drain-pipe communicating with the pipe $f'$ and the traps $x$ and $x'$ for draining the excess of water away or into a receptacle.

The apparatus or plant especially adapted for gasifying fuel for gas-engine purposes and for largely returning the sensible heat of the gas to the generator having been described, I will now proceed to explain how the invention is practiced therein.

A bed of ash or suitable non-combustible material is placed and maintained upon and above the bottom $a'$ of the producer, which is capable of being readily and effectually revolved by means of the crank $a^7$ to permit of the discharge over its periphery of the required quantity of accumulating ash or non-combustible material, maintaining at a certain height above the bottom in the combustion-chamber $a^3$ a bed of fuel. In practice, with a producer of the type described, in using cold air charged with steam a large proportion of the steam is condensed before entering the incandescent fuel, which saturates the bed of ash or non-combustible material beneath the fuel. This condensation of the steam serves the useful purpose of aiding in the disintegration of clinker and facilitates the discharge or uniform grinding down of the non-combustible material over the periphery of the bottom. On the other hand, in the use of heated air or air heated above 212° Fahrenheit, when no condensation of steam mixed with air can take place, the bed of non-combustible material beneath the incandescent fuel is kept saturated by an independent water-supply arranged around about the wall of the combustion-chamber of the producer contiguous to the top of the bed of ash or non-combustible material, which tends to maintain said bed in a moist or wet condition, and thereby insure the best results in practice of the producer. After a fire has been started in the combustion-chamber $a^3$ above the bed of ash or non-combustible material, suitable fuel is introduced through the hopper $a$ into the combustion-chamber, and at the same time a blast of air or a mixture of air and steam is caused to pass through the vertical inlet-pipe $a^5$ into the incandescent or burning fuel. The resultant gas, while at a comparatively high temperature, passes through the offtake $a^6$ into the chamber $q$ of the combined gas-cooler and air-heater B, and thence through the series of vertically-supported tubes $b^4$, imparting the major portion of its heat to said tubes. During the passage of the gas through the cooler and heater B a considerable quantity of the dust, dirt, carbon, soot, tar, or other extraneous matter contained in the gas leaving the producer will be deposited in the chamber $q^2$, and may be readily removed therefrom through the door $b'$. The cool and comparatively clean gas passes from the chamber $b^3$ through the pipe C', past the water seal $e$ of the scrubber E, and escapes into the interior of the scrubber. The gas ascending through the saturated porous material in the scrubber E is thoroughly cooled and purified, and then passes from the top through the offtake-pipe E' to the receiver or regulator F. This gas receiver or regulator, it should be borne in mind, is set for the proper pressure of the gas to be carried and automatically controls the production, as hereinafter more fully described. The clean gas finally passes from the receiver or regulator F through the pipe or conduit I to the gas-engine. (Not shown, but which may be of any of the ordinary types or forms of engines.) A variable supply of atmospheric air, according to requirements, is forced by means of the fan-blower G through the pipe H into the combined cooler and heater B, or a steam-blower may be employed for forcing or driving the air instead of a fan-blower, as described. The blast or current of atmospheric air absorbs a portion of the water previously evaporated in the lower part of the heater B, and in ascending through the same around and about the series of hot vertical tubes $b^4$ becomes heated. The warm blast of air and water-vapor passing from at or near the top of the chamber surrounding the vertical tubes $b^4$ and from opposite the entrance-pipe H at the bottom of the chamber $q'$ to and through the pipe C, its horizontal extension $c$, and the vertical inlet-pipe $a^5$ is discharged or distributed radially, or nearly so, therefrom into the bed of ash or non-combustible material, and the supported bed of incandescent fuel or the warm blast of air may be further charged with vapor before being introduced into the fuel in the combustion-chamber $a^3$, as follows: Hot water from the water-cooled top of the producer A is allowed to enter the pipe D, and a certain quantity thereof allowed to flow through the branch pipe $d'$, and is heated by the gas in the combined gas-cooler and air-heater B and discharged in the form of a spray into the upper interior portion of the vertical air and water-vapor inlet-pipe $a^5$, thereby vaporizing a considerable portion of the water or charging or saturating the incoming blast of warm air with water-vapor. The water discharged through the branch pipe $d'$ and not evaporated and mingling with the blast of air in the pipe $a^5$ collects in the horizontal portion of the pipe $c$, and the vapor thereof further mingles with the incoming blast of air. The excess of water contained in the pipe $c$ escapes or drains through the pipe $c'$ into the trap $x$. Hot water from the pipe D, passing through the branch pipe $d$, backs water into and maintains it at a given height in the interior of the chamber $q'$, surrounding the series of vertical tubes $b^4$, and in the evaporation of the water taking place it commingles with the blast of air in being heated, as above mentioned, and serves, also, to seal the ends of the tubes $b^4$. The excess of water from the pipe $e'$ is discharged into the trap $x'$.

The quantity of water evaporated and commingling with the heated air can be regulated to exactly the quantity the producer is capable of carrying—that is, of dissociating into oxygen and hydrogen—and still maintain continuously good incandescence of the fuel with low carbonic acid. It follows, therefore, that as the major portion of the sensible heat of the gas can be returned to the producer through the medium of the air and water-vapor entering it, more water-vapor can be carried and dissociated for enriching the gas, and thereby decreasing the nitrogen and increasing the hydrogen in the gas. A further economy is that when air is heated to a temperature above 212° Fahrenheit no condensation of vapor once mingled with it will take place.

Having hereinbefore fully explained the manner of generating and purifying the gas and of returning the sensible heat thereof to the combustion-chamber $a^3$ in the form of heated air and vapor of water, the method of automatically regulating the generation of the gas to meet requirements of a gas-engine or engines will now be described.

If the volume of gas generated in the producer A is not sufficient for the requirements of the engine, the gas receiver or regulator F descends, actuating the belt-shifter L, which causes the belt $k$ to be shifted toward the right hand and permits the blower G to attain a greater velocity. If the volume of gas generated in the producer A exceeds the requirements of the engine, the gas receiver or regulator F ascends, thereby permitting the belt $k$ to be shifted to reduce the speed of the blower. Instead of regulating the volume of air, and consequently the production of gas, by varying the velocity of the blower G, the speed of the blower may be set and maintained for the maximum requirements of the engine, and the supply of air controlled by the valve $h'$. This valve $h'$ is automatically opened by means of the rod O and cord $o'$ when the dome $f^2$ of the gas receiver or regulator F is lowered, and automatically closed when the dome $f^2$ is raised in any preferred manner.

It is obvious that, if required, both of the above-mentioned methods for regulating the supply of air to the producer A may be availed of at the same time. For instance, the speed of the blower G may be increased and the valve $h'$ opened when the dome $f^2$ of the receiver or regulator F is descending, and the speed of the blower may be lessened and the valve $h'$ closed when the dome $f^2$ is ascending.

To supply a blast of air for starting the producer A and to make gas to start the engine and apparatus, a weight suitably elevated (not shown) may be used to actuate the blower. This weight may consist of a bucket elevated by hand and loaded with a sufficient quantity of water. It may also consist of a suitable material elevated by the engine, when running, and be retained in an elevated position until required for actuating the blower and while the engine is at rest.

Having thus described the nature and objects of my invention, what I claim as new, and desire to secure by Letters Patent, is—

1. The combination, with an apparatus for making gas, comprising a producer, a blower, a receiver, a counterbalanced dome, and pipe-connections, of differential pulleys for driving said blower, a driving-belt passing over said pulleys, and a belt-shifter engaging said belt and attached to and moving with said dome, substantially as and for the purposes set forth.

2. The combination, with an apparatus for making gas, comprising a producer, a combined gas-cooler and air-heater, a scrubber, a receiver and regulator, a counterbalanced dome, pipe-connections from said producer to said combined gas-cooler and air-heater and scrubber and extending therefrom into the interior of said dome, a blowing device, and pipe-connections from said blowing device to said air-heater and gas-cooler and producer, of differential pulleys for transmitting motion to said blower, a belt passing over said pulleys, and a belt-shifter engaging said belt and attached to and moving with said counterbalanced dome, substantially as and for the purposes set forth.

In witness whereof I have hereunto set my signature in the presence of two subscribing witnesses.

WILLIAM J. TAYLOR.

Witnesses:
 GEO. W. REED,
 THOMAS M. SMITH.